(12) United States Patent
Granata (10) Patent No.: US 10,457,358 B1
(45) Date of Patent: Oct. 29, 2019

(54) MARINE SAFETY LIGHTING (71) Applicant: Peter Granata Design, LLC, Bluffton, SC (US)

(72) Inventor: Peter Granata, Bluffton, SC (US)

(73) Assignee: Peter Granata Design, LLC, Bluffton, SC (US)

( * ) Notice: Subject to any disclaimer, the term of this patent is extended or adjusted under 35 U.S.C. 154(b) by 0 days.

(21) Appl. No.: 16/386,460

(22) Filed: Apr. 17, 2019

Related U.S. Application Data

(60) Provisional application No. 62/668,575, filed on May 8, 2018, provisional application No. 62/791,985, filed on Jan. 14, 2019.

(51) Int. Cl.
*B63B 45/04* (2006.01)
*H05B 37/02* (2006.01)
*B60Q 1/14* (2006.01)
*B60Q 1/26* (2006.01)

(52) U.S. Cl.
CPC .............. *B63B 45/04* (2013.01); *B60Q 1/143* (2013.01); *B60Q 1/2619* (2013.01); *H05B 37/0218* (2013.01); *B60Q 2400/30* (2013.01)

(58) Field of Classification Search
None
See application file for complete search history.

(56) References Cited

U.S. PATENT DOCUMENTS

| | | | |
|---|---|---|---|
| 5,614,788 A | 3/1997 | Mullins et al. | |
| 5,636,916 A * | 6/1997 | Sokolowski | B60Q 1/26 340/984 |
| 5,850,803 A * | 12/1998 | Jones | B63B 35/731 114/343 |
| 6,200,009 B1 | 3/2001 | Schulte | |
| 6,637,915 B2 * | 10/2003 | von Wolske | B63B 45/00 340/984 |
| 7,794,124 B2 | 9/2010 | Hulsey et al. | |
| 8,757,851 B1 | 6/2014 | Clemons | |
| 8,986,056 B2 | 3/2015 | Neprud | |

* cited by examiner

*Primary Examiner* — Jany Richardson
(74) *Attorney, Agent, or Firm* — Dority & Manning, P.A.

(57) ABSTRACT

When a marine engine is on, automatic daytime running lights shall be illuminated. For example, white lights situated in the bow area of the boat would increase visibility of a boat to others, for safety purposes. The same lights or lights generally in the same area, at dusk and/or at night shall manually or automatically transition to red/green navigation lights.

31 Claims, 4 Drawing Sheets

MARINE SAFETY LIGHTING

PRIORITY INFORMATION

The present application claims priority to U.S. Provisional Patent Application Ser. No. 62/668,575 titled "Marine Safety Lighting" filed on May 8, 2018, and claims priority to U.S. Provisional Patent Application Ser. No. 62/791,985 also titled "Marine Safety Lighting" filed on Jan. 14, 2019, the disclosures of which are fully incorporated by reference herein and for all purposes.

BACKGROUND OF THE SUBJECT MATTER

With the sport of boating continuing to rise in popularity, lakes, rivers, and waterways are becoming more crowded than ever before. Unlike public roads and highways, there are no clearly marked lanes of operation for boats. Boaters must remain aware of their operating surroundings and alert other boaters to their presence. Currently, boating isn't as heavily regulated by governmental mandates as the automotive industry; therefore, the boating industry is self-reliant for developing new safety features that are vital to protect both the sport enthusiasts from potential dangers and the industry from any misguided forms of governmental regulation.

Anytime boaters gather along a sandbar, in a rafting party, or other crowded area, it becomes important to know which boats have their engines running. It is not always possible to hear due to wind, waves, music, or other factors.

Additionally, sunlight during late afternoon or early morning can cast deep shadows along the shoreline that can hide a boat operating close to shore.

Various arrangements have previously been disclosed involving lights and the operation of boats. See, for example, U.S. Pat. No. 5,614,788 to Mullins et al., U.S. Pat. No. 5,636,916 to Sokolowski, U.S. Pat. No. 6,200,009 to Schulte, U.S. Pat. No. 7,794,124 to Hulsey et al., U.S. Pat. No. 8,757,851 to Clemons, and U.S. Pat. No. 8,986,056 to Neprud.

The Convention on the International Regulations for Preventing Collisions at Sea, 1972 (a/k/a COLREGs) are published by the International Maritime Organization (IMO). They are navigation rules for ships and vessels at sea to prevent collisions. Various of such regulations are for indicating emergency vehicles, towing vehicles, and dire distress situations. In some navigational circumstances, a strobe light may be indicated and its use regulated. The speed of a strobe flash, up to 50 to 70 flashes per minute, is generally higher than that of an intermittent signal. A strobe light is also typically of high intensity intermittent similar to a bright photographic flash.

In particular, various regulations (Navigation Rules) may allow for the use of a "high intensity white light flashing at regular intervals from 50 to 70 times per minute" (i.e. strobe light) as a distress signal. Otherwise, the use of "strobe lights" is prohibited for use as a "signal to attract attention".

Certain regulations relate to the use of lights which may be displayed for so-called "public safety activities", and may allow use of alternating red & yellow flashing lights at regular intervals of 120 flashes or more per minute. While not providing for any particular operational privilege on the waterway, such a light provides an identification purpose.

In other situations where it would be necessary or desirable to attract the attention of another vessel, a vessel may make light or sound signals so long as they could not be mistaken for any of the other such signals that are expressly authorized. This would mean for example, that for simply attracting the attention of (to be noticed by) another vessel, a system would need to avoid the use of high intensity intermittent or revolving lights, such as strobe lights.

BRIEF SUMMARY OF THE SUBJECT MATTER

When a marine engine is on, automatic daytime running lights as presently disclosed shall be illuminated. For example, flashing white lights situated in the bow area of the boat would increase visibility of a boat to others, for safety purposes. The same lights or lights generally in the same area, at dusk and/or at night shall manually or automatically transition to red/green navigation lights. The nature of the flashing lights per presently disclosed subject matter can assume various formats, such as a blinking or possibly strobe type of effect, so long as there is no overlap of specific operational characteristics in conflict with any applicable safety regulations or practices.

In some instances, such flashing lights per presently disclosed subject matter may incorporate various signals. For example, patterns may be used, such as incorporated into Morse Code. In addition, specific maritime usage of Morse Code may be incorporated, such as a repeating loop or sequence of the letters "QD" per indicate that a boat is going ahead. Still further, looped sequences of letters may incorporate pauses between "transmission" or signaling of letter sequences, as a break in such sequences, or to designate separate transmissions of the sequence.

There are numerous instances where Daytime Safety Lights as presently disclosed would be effective. For example, Daytime Safety Lights will alert other boaters, as well as swimmers, that a boat has an engine running. Daytime Safety Lights will identify a shadowed boat in operation.

In some instances, Daytime Safety Lights may emit a flashing white light, to further increase visibility. They will illuminate when the engine ignition is on, and remain lighted during engine operation. As twilight approaches, Night Navigation Lights would be manually or automatically turned on in place of the Daytime Safety Lights. As part of switching to a Night Mode, the turn-on operations Night Navigation Lights could be provided so as to extinguish the Daytime Safety Lights automatically.

As a matter of location, Daytime Safety Lights can be incorporated into a housing containing Night Navigation Lights, or they can be separately installed at/near the bow area of the boat. An optional light-sensitive sensor will detect twilight and deactivate the Daytime Safety Lights while simultaneously activating the red/green Night Navigation Lights. The location of the sensor for automatic illumination of the Navigation Lights can be housed in the actual unit or it can be located separately, such as on the dashboard.

Furthermore, those of ordinary skill in the art will understand from the complete disclosure herewith that various descriptions herein may be practiced in the context of either methodologies or devices designed to practice such methodologies. In such context, still further, those practicing presently disclosed subject matter may make use in given embodiments thereof, of various known components, such as lights, batteries, switches, or wiring circuits, specific details of which form no particular aspect of the presently disclosed subject matter.

One exemplary embodiment of presently disclosed subject matter relates to a method for increasing visibility of a motorboat having an operating engine in the vicinity of other boats. Such method preferably comprises the steps of providing a light emitting safety lighting device positioned in the bow area of the motorboat to controllably cast safety light in an outward direction from the motorboat; connecting the safety lighting device with a power source, the engine of the motorboat, and a circuit; and providing a switch in the circuit situated so at automatically energize and illuminate the light emitting safety lighting device with the power source in response to operation of the engine of the motorboat, whereby cast safety light from the safety lighting device increases visibility of the motorboat to other boats in the vicinity of the motorboat whenever the engine thereof is operating, for safety purposes.

In some instances, such cast safety light may comprise white light.

In others, such safety lighting device may comprise a pair of white lights on either side of the motorboat bow. In some such instances, such safety lighting device may further comprise an additional pair of respectively colored lights on either side of the motorboat bow.

In some of those embodiments, the method may further include the step of energizing the pair of white lights whenever ambient light conditions around the motorboat indicate daylight conditions, while deenergizing the pair of respectively colored lights. In others, it may further include the step of energizing the pair of respectively colored lights whenever ambient light conditions around the motorboat indicate other than daylight conditions, while deenergizing the pair of white lights.

In yet another exemplary embodiment of presently disclosed subject matter, a method of providing marine safety lighting for a boat of the type having an engine and an associated ignition therefor, may be provided. Such method preferably comprises providing a boat with controllable relatively dim lights adjacent the bow area of the boat; automatically activating the lights whenever the boat ignition is on; and continuing to activate the lights while the boat engine is operating.

In some such embodiments, the lights may comprise respective white lights and colored lights; and the method may further comprise automatically activating only the white lights whenever the boat ignition is on during daylight ambient conditions, and automatically activating only the colored lights whenever the boat ignition is on during not-daylight ambient conditions. In further alternatives thereof, the white lights in some instances may comprise a pair of white lights on respective sides of the bow area of the boat; and the colored lights may comprise respective red and green lights on respective port and starboard sides of the bow area of the boat.

Yet another exemplary embodiment of presently disclosed subject matter may relate to a marine lighting system for increasing visibility of a motorboat of the type having an engine and an associated ignition. Such system may preferably comprise a light emitting safety lighting device adapted to be positioned in the bow area of a motorboat to controllably cast safety light in an outward direction from the motorboat; a power source and a circuit connected with the safety lighting device and the engine of the motorboat; and a switch in the circuit situated so at automatically energize and illuminate the light emitting safety lighting device with the power source in response to operation of the engine of the motorboat. Per such system, cast safety light from the safety lighting device increases visibility of the motorboat to other boats in the vicinity of the motorboat whenever the engine thereof is operating, for safety purposes.

In some such systems, such safety lighting device may comprise a pair of white lights to be positioned on either side of the motorboat bow. In some variations thereof, such safety lighting device may further comprise an additional pair of respectively colored lights to be positioned on either side of the motorboat bow; a light-sensitive sensor for mounting on the motorboat to detect ambient light conditions around the motorboat; and such switch may be operatively associated with such light-sensitive sensor, for controllably energizing only such pair of white lights whenever detected ambient light conditions around the motorboat indicate daylight conditions, and for energizing only such pair of respectively colored lights whenever ambient light conditions around the motorboat indicate other than daylight conditions.

In yet other of such systems, such colored lights may comprise respective red and green lights to be positioned on respective port and starboard sides of the bow area of the motorboat.

Per other presently disclosed embodiments, such system may be combined with a motorboat with such pair of white lights positioned on either side of the motorboat bow, and with such respective red and green lights positioned on respective port and starboard sides of the bow area of the motorboat.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, to one of ordinary skill in the art, is set forth more particularly including the specification, and including reference to the accompanying figures in which.

Repeat use of reference characters in the present specification and drawings is intended to represent the same or analogous features or elements or steps of the presently disclosed subject matter.

DESCRIPTION OF THE SUBJECT MATTER

Daytime running lights in accordance with presently disclosed subject matter preferably comprise lights located on or near the front of a boat that remain on whenever the engine is running. Their purpose is unlike docking lights or headlights. Instead, the daytime running lights as presently disclosed are intended to be fairly dim and not sufficient to illuminate the waters ahead. The purpose of the presently disclosed daytime running lights is to increase the visibility of the boater's boat, so that other boaters can see the boat on the water.

Daytime running lights as presently disclosed are a safety feature intended to reduce accidents by increasing the contrast between vehicles (boats or the like) and their surrounding background (either in or out of the water). As disclosed, white DAYTIME forward running lights are position indicator signals to other marine operators. They are not navigation aids for the host vessel. Accordingly, the presently disclosed daytime forward running lights are intended to be located on the front of a boat. It will be understood that side running lights may also be applicable depending on the size and formation of the forward design of a given vessel.

In accordance with certain aspects and embodiments of presently disclosed subject matter, daytime running lights may be wired into, or otherwise operatively associated with, the ignition of a practicing vessel, so as to be automatically lighted and in operation whenever the key has engaged the ignition and during operation. As will be understood by the complete disclosure herewith, operation of the white daytime running lights is over-ridden by the manually operated green/red navigation light operation at night, or an automated system that senses lack of daylight and switches to a dusk or evening/night mode of operation.

Unlike docking lights or headlights, daytime running lights are not intended to illuminate at night and are not navigationally powerful. The main purpose of daytime running lights is to increase the visibility of the host vessel.

Figure 1A:
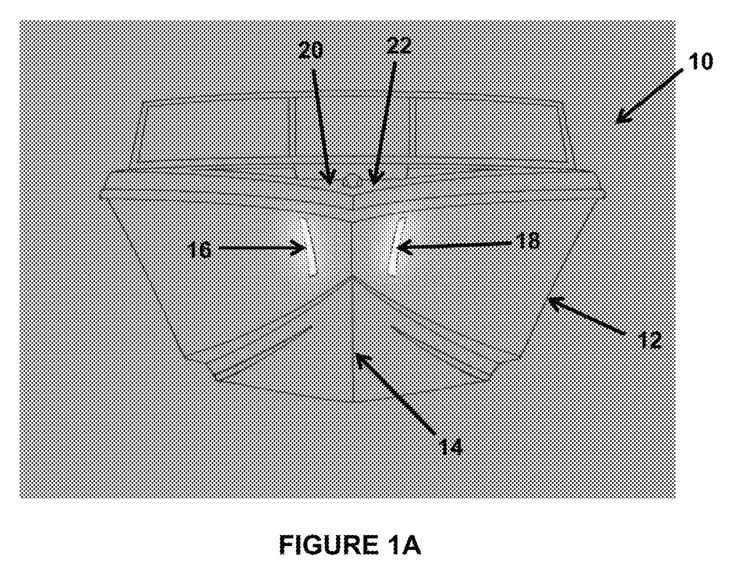
FIGS. 1A and 1B illustrate front elevational views of an exemplary embodiment of a boat outfitted with both respective Daytime Safety Lights and Night Navigation Lights, in accordance with presently disclosed subject matter.
Figure 1B:
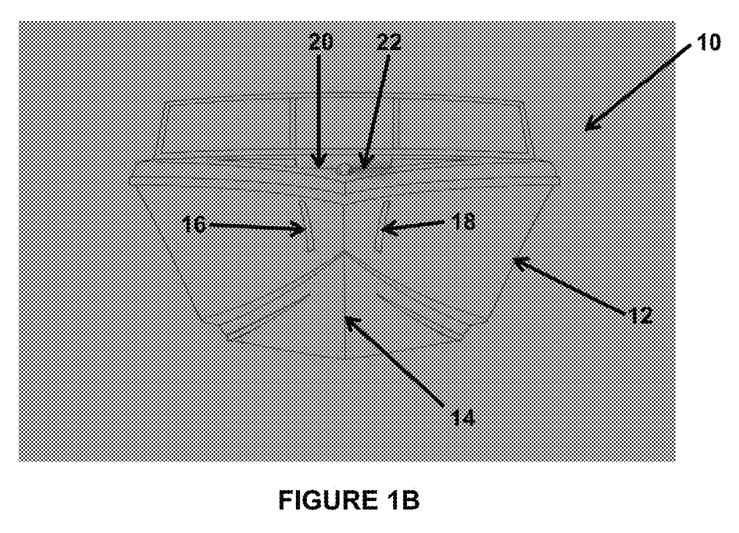

FIGS. 1A and 1B illustrate front elevational views of an exemplary embodiment of a boat generally 10 outfitted with both respective Daytime Safety Lights and Night Navigation Lights, in accordance with presently disclosed subject matter. More particularly, boat 10 may have a hull generally 12 which has a centerline generally 14. While the presently disclosed subject matter may be adapted for various vessels have hulls with or without centerlines, the exemplary embodiment of present FIGS. 1A and 1B illustrates an example which allows for the daytime running lights (generally 16 and 18) to be visible from either approaching front/side perspective of boat 10 without being blocked by centerline 14. Preferably white lights 16 and 18 are on either side of centerline 14, as shown by the examples. In accordance with presently disclosed subject matter, it is intended that such safety lights (for visibility of operations of boat 10 by others) are illuminated whenever the engine for boat 10 is on/running.

FIGS. 1A and 1B also represent green/red navigation lights 20 and 22 for operation at night, or an automated system that senses lack of daylight and switches to a dusk or evening/night mode of operation. Such lights 20 and 22 are off in the illustration of FIG. 1A (in which white daytime running lights 16 and 18 are on), and such lights 20 and 22 are on in FIG. 1B (in which daytime running lights 16 and 18 are off). Thus, operation of such respective pairs of lights is intended as being mutually exclusive. Any system that operates both sets of such lights will when on select only one such pair for operation at a time. Thus, per presently disclosed subject matter, when an engine of boat 10 is on/running, one pair of such lights will be on, but only one pair of the two pairs, depending on the daytime or evening/night mode established by conditions in which the vessel/boat 10 is operating at the time.

It is also intended that the daytime running lights of the exemplary embodiment of FIGS. 1A and 1B comprise a separate light from the housing of any navigation lights.

Figure 2A:
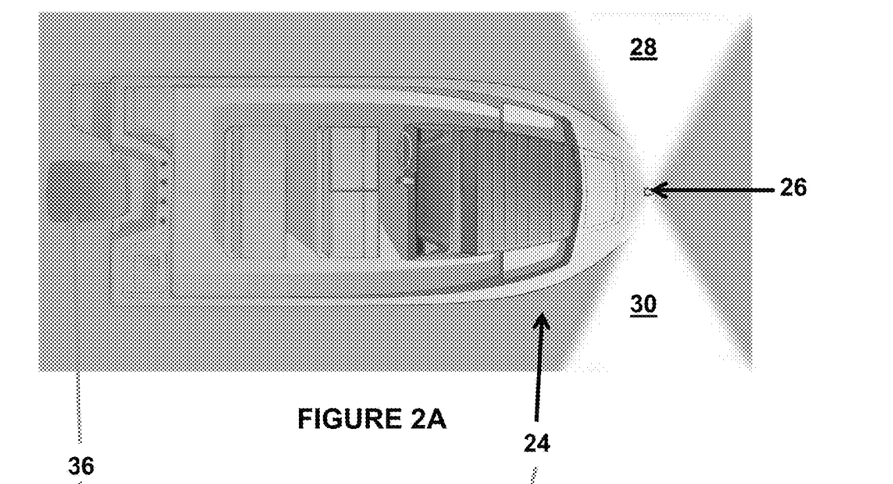
FIGS. 2A and 2B illustrate top elevational views of an alternative exemplary embodiment of a boat outfitted with integrally embodied Daytime Safety Lights and Night Navigation Lights, in accordance with presently disclosed subject matter.
Figure 2B:
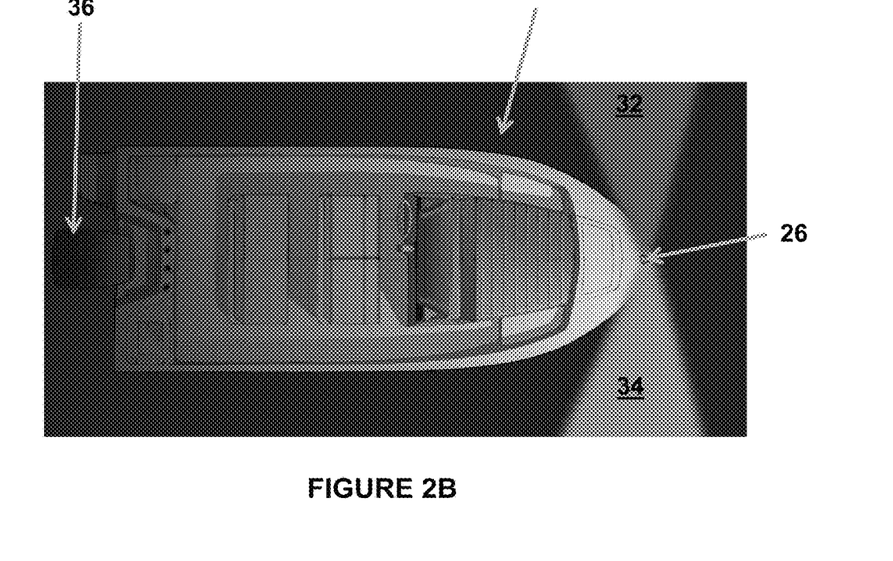

FIGS. 2A and 2B illustrate top elevational views of an alternative exemplary embodiment of a boat outfitted with integrally embodied Daytime Safety Lights and Night Navigation Lights, in accordance with presently disclosed subject matter. In other words, per the illustrated alternative embodiment, the Daytime Running Lights are shown in use as if they were integrally part of the night time navigation light.

More particularly, an exemplary boat 24 has a front bow light housing generally 26 which includes both the presently disclosed Daytime Running Lights and the Night Navigation Lights. FIG. 2A illustrates representative cones of white light 28 and 30 (for Daylight Running Light purposes) which are cast from light housing 26, while FIG. 2B illustrates representative cones of red and green light (for Night Navigation Light purposes), respectively, 32 and 34 as cast from housing 26. Again, in accordance with presently disclosed subject matter, while the engine (generally 36) of boat 20 is on/operating, at least one of the two pairs of lights 28/30 and 32/34 (but only one pair thereof) will be operating.

Figure 3A:
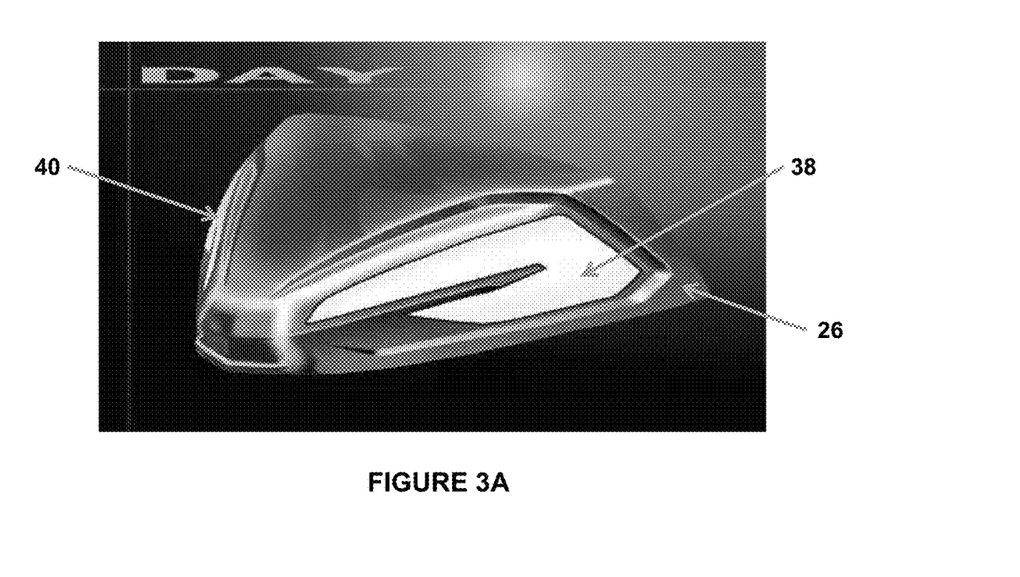
FIGS. 3A and 3B illustrate enlarged, isolated perspective views of the respective exemplary embodiments of Daytime Safety Lights and Night Navigation Lights in accordance with presently disclosed subject matter, in accordance with the exemplary views of present FIGS. 2A and 2B.
Figure 3B:
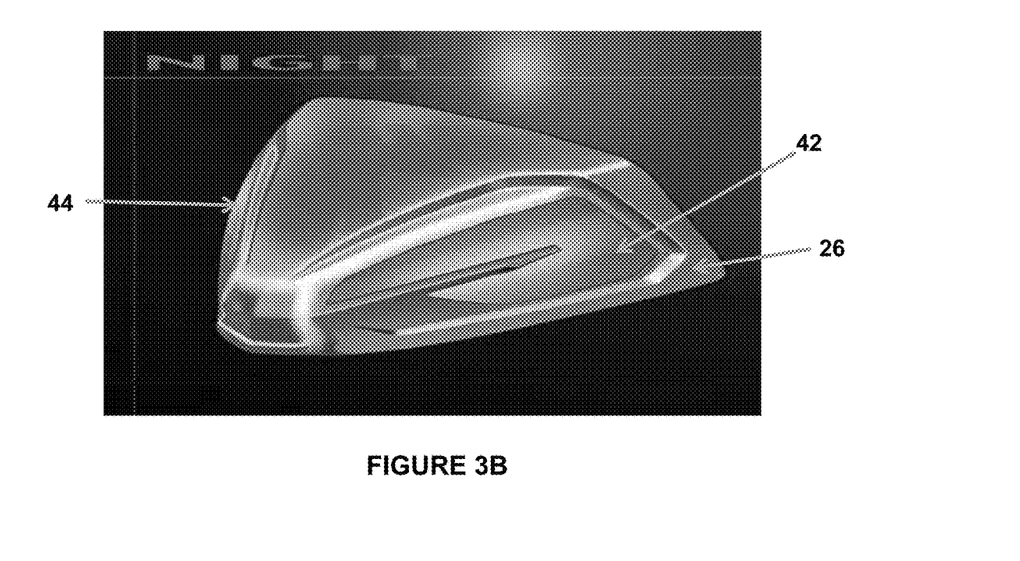

FIGS. 3A and 3B illustrate enlarged, isolated perspective views of the respective exemplary embodiments of Daytime Safety Lights and Night Navigation Lights in accordance with presently disclosed subject matter, in accordance with the exemplary views of present FIGS. 2A and 2B. More particularly, housing 26 may be provided, for example, by an original equipment manufacturer, so as to include both forms of lights as disclosed herewith. Both white lights 38 and 40 may be included on respective sides of housing 26, so as to cast the respective lights cones 28 and 30 of present FIG. 2A, while red and green lights 42 and 44, respectively, may cast red and green cones of light 32 and 34, respectively, of FIG. 2B. Again, per the presently disclosed subject matter, lights 38 and 40, once activated, may transition under presently disclosed subject matter to lights 42 and 44, as operational conditions move from daytime operations to twilight/night operations.

Figure 4A:
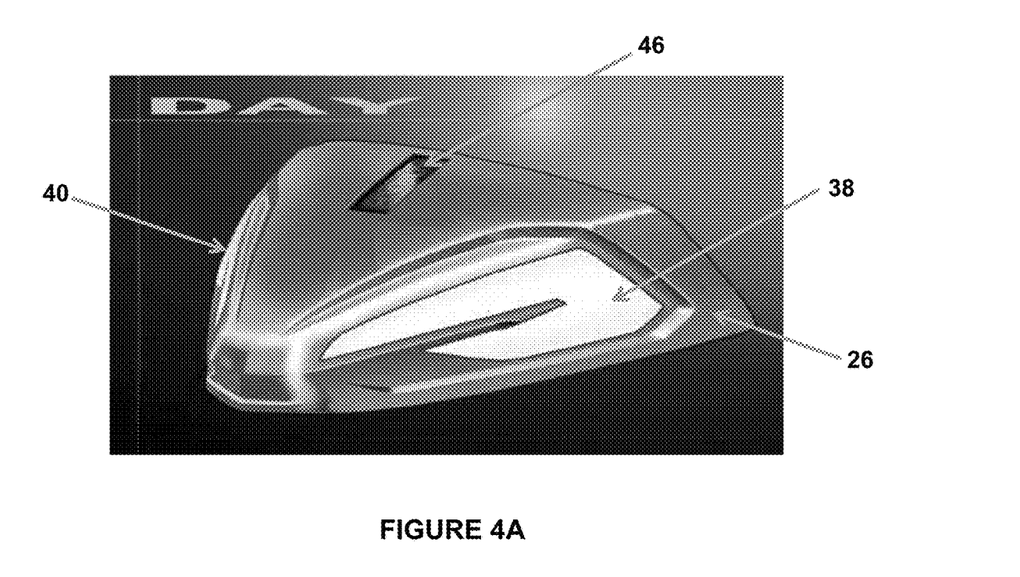
FIGS. 4A and 4B illustrate enlarged, isolated perspective views of the respective exemplary embodiments of Daytime Safety Lights and Night Navigation Lights in accordance with presently disclosed subject matter, in accordance with the exemplary views of present FIGS. 3A and 3B, respectively, and with added exemplary sensor element 46.
Figure 4B:
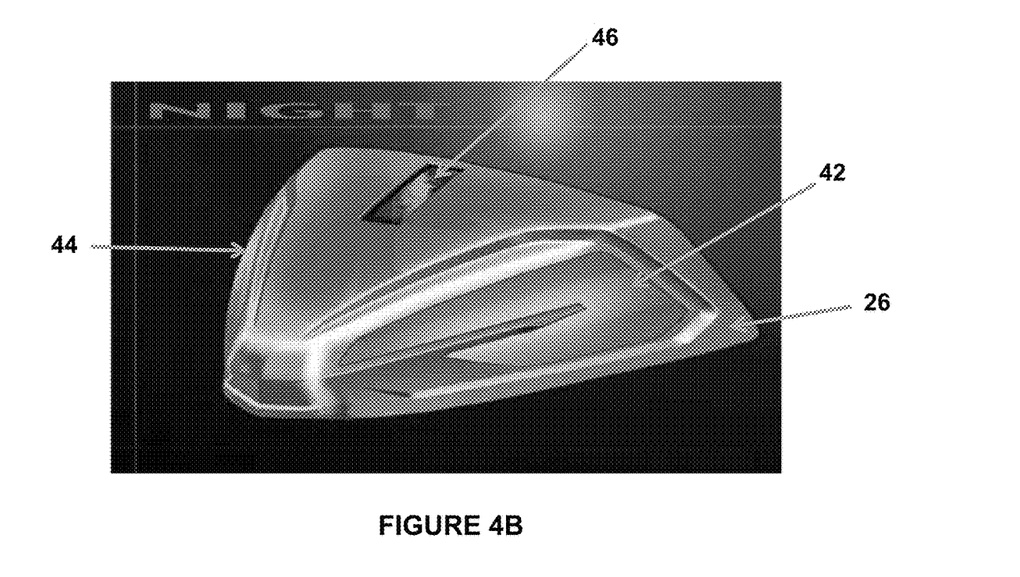

FIGS. 4A and 4B illustrate enlarged, isolated perspective views of the respective exemplary embodiments of Daytime Safety Lights and Night Navigation Lights in accordance with presently disclosed subject matter, in accordance with the exemplary views of present FIGS. 3A and 3B, respectively, and with added exemplary sensor element 46.

The presently disclosed subject matter is not dependent on the type of lights used. For example, LED (light-emitting diode) or other forms of lights such as incandescents with such as krypton bulbs may be practiced. Additionally, such lights may be powered by either of battery or generator-created electricity.

Light output strength is measured in lumens, a measure of the intensity of light coming from a device. For example, a lower end range of about 20 lumens may be sufficient in some circumstances, or higher lumen levels may be practiced. For example, preferred light intensity in most circumstances would be less than that of a strobe light, and typically more comparable to the kilowatt power of a common flashlight.

Still further, shaded light covers may be selectively used in order to create white versus green or red light projections. Part of manually-based embodiments for switching between white and colorized (red/green) lights may include embodiments where the same bulb or group of LED's is used in combination with different colored covers, such as clear versus red or green. Users may devise appropriate mechanical embodiments for either physically moving a light relative to different covers, or vice versa. Other manually-based embodiments for switching between white and colorized (red/green) lights may include embodiments where the operator changes a switch so that one set of lights (or light covers) versus another is selected for automated operation while the boat engine is operating.

All such variations, and others as would be apparent to one of ordinary skill in the art, are intended to come with the spirit and scope of the present disclosure.

While the presently disclosed subject matter has been described in detail with respect to specific exemplary embodiments thereof, it will be appreciated that those skilled in the art, upon attaining an understanding of the foregoing, may readily produce alterations to, variations of, and equivalents to such embodiments. Accordingly, the scope of the presently disclosed subject matter is by way of example rather than by way of limitation, and the subject disclosure does not preclude inclusion of such modifications, variations and/or additions to the presently disclosed subject matter as would be readily apparent to one of ordinary skill in the art.

What is claimed is:

1. A method for increasing visibility of a motorboat having an operating engine in the vicinity of other boats, comprising the steps of:
    providing a light emitting safety lighting device positioned in the bow area of the motorboat to controllably cast safety light in an outward direction from the motorboat;
    connecting the safety lighting device with a power source, the engine of the motorboat, and a circuit; and
    providing a switch in the circuit situated so at automatically energize and illuminate the light emitting safety lighting device with the power source in response to operation of the engine of the motorboat, whereby cast safety light from the safety lighting device increases visibility of the motorboat to other boats in the vicinity of the motorboat whenever the engine thereof is operating, for safety purposes.

2. A method as in claim 1, wherein said cast safety light comprises white light.

3. A method as in claim 1, wherein said safety lighting device comprises a pair of white lights on either side of the motorboat bow.

4. A method as in claim 3, wherein said safety lighting device further comprises an additional pair of respectively colored lights on either side of the motorboat bow.

5. A method as in claim 4, further including the step of energizing the pair of white lights whenever ambient light conditions around the motorboat indicate daylight conditions, while deenergizing the pair of respectively colored lights.

6. A method as in claim 4, further including the step of energizing the pair of respectively colored lights whenever ambient light conditions around the motorboat indicate other than daylight conditions, while deenergizing the pair of white lights.

7. A method as in claim 1, wherein:
    the safety lighting device comprises a white light on the motorboat bow, and a colored light on the motorboat bow; and
    said method further includes energizing only the white light whenever ambient light conditions around the motorboat indicate daylight conditions, and energizing only the colored light whenever ambient light conditions around the motorboat indicate other than daylight conditions.

8. A method as in claim 7, wherein:
    the white light comprises a pair of white lights on either side of the motorboat bow; and
    the colored light comprises a pair of respective red and green lights on respective sides of either side of the motorboat bow.

9. A method as in claim 8, wherein the red and green lights are respectively on respective port and starboard sides of the motorboat bow.

10. A method as in claim 8, wherein the respective red and green lights comprise non-colored lights which are mounted under respective red and green colored covers, so as to give off red and green light, respectively.

11. A method as in claim 1, wherein the cast safety light from the safety lighting device is controlled to produce an intermittent operation, for improved attention of boats in the vicinity without blinking at a distress signal level of flashing.

12. A method as in claim 1, wherein the cast safety light from the safety lighting device is controlled to produce an intermittent operation which repeats signals coded by intermittent operation.

13. A method as in claim 12, wherein the intermittent coded signal comprises a Morse code signal.

14. A method as in claim 1, wherein the cast safety light from the safety lighting device produces sufficient light for visibility of the motorboat to other boats in the vicinity without producing forward navigation aid lighting for the motorboat during daylight operations.

15. A method as in claim 14, wherein the cast safety light from the safety lighting device produces a light level of between about 20 to about 100 lumens.

16. A method as in claim 1, wherein the power source comprises one of a battery or generator-created electricity.

17. A method of providing marine safety lighting for a boat of the type having an engine and an associated ignition therefor, comprising:

providing a boat with controllable relatively dim lights adjacent the bow area of the boat;

automatically activating the lights whenever the boat ignition is on; and continuing to activate the lights while the boat engine is operating.

18. A method as in claim 17, wherein:

the lights comprise respective white lights and colored lights; and the method further comprises automatically activating only the white lights whenever the boat ignition is on during daylight ambient conditions, and automatically activating only the colored lights whenever the boat ignition is on during not-daylight ambient conditions.

19. A method as in claim 18, wherein:

the white lights comprise a pair of white lights on respective sides of the bow area of the boat; and the colored lights comprise respective red and green lights on respective port and starboard sides of the bow area of the boat.

20. A method as in claim 17, wherein the light has strength of at least about 20 lumens.

21. A method as in claim 17, wherein the light automatically flashes at less than 50 times per minute.

22. A method as in claim 17, wherein the light automatically flashes per a preselected Morse code signal.

23. A method as in claim 22, wherein the preselected Morse code signal comprises repetition of a two-letter sequence for the letters "QD" to indicate that the boat is moving ahead.

24. A marine lighting system for increasing visibility of a motorboat of the type having an engine and an associated ignition, comprising:

a light emitting safety lighting device adapted to be positioned in the bow area of a motorboat to controllably cast safety light in an outward direction from the motorboat;

a power source and a circuit connected with the safety lighting device and the engine of the motorboat; and a switch in the circuit situated so at automatically energize and illuminate the light emitting safety lighting device with the power source in response to operation of the engine of the motorboat, whereby cast safety light from the safety lighting device increases visibility of the motorboat to other boats in the vicinity of the motorboat whenever the engine thereof is operating, for safety purposes.

25. A system as in claim 24, wherein said safety lighting device comprises a pair of white lights to be positioned on either side of the motorboat bow.

26. A system as in claim 25, wherein:

said safety lighting device further comprises an additional pair of respectively colored lights to be positioned on either side of the motorboat bow;

a light-sensitive sensor for mounting on the motorboat to detect ambient light conditions around the motorboat; and said switch is operatively associated with said light-sensitive sensor, for controllably energizing only said pair of white lights whenever detected ambient light conditions around the motorboat indicate daylight conditions, and for energizing only said pair of respectively colored lights whenever ambient light conditions around the motorboat indicate other than daylight conditions.

27. A system as in claim 26, wherein said colored lights comprise respective red and green lights to be positioned on respective port and starboard sides of the bow area of the motorboat.

28. A system as in claim 27, wherein said system is combined with a motorboat with said pair of white lights positioned on either side of the motorboat bow, and with said respective red and green lights positioned on respective port and starboard sides of the bow area of the motorboat.

29. A system as in claim 24, wherein the cast safety light has strength of at least about 20 lumens.

30. A system as in claim 24, wherein the switch includes a control chip for automatically flashing the cast safety light at less than 50 times per minute.

31. A system as in claim 30, wherein the control chip is operative for automatically flashing the cast safety light per a preselected Morse code signal.

* * * * *

UNITED STATES PATENT AND TRADEMARK OFFICE
CERTIFICATE OF CORRECTION

| | | |
|---|---|---|
| PATENT NO. | : 10,457,358 B1 | Page 1 of 1 |
| APPLICATION NO. | : 16/386460 | |
| DATED | : October 29, 2019 | |
| INVENTOR(S) | : Peter Granata | |

It is certified that error appears in the above-identified patent and that said Letters Patent is hereby corrected as shown below:

In the Claims

Claim 1 Column 7, Lines 63-64, change "situated so at automatically" to --situated so as to automatically--

Claim 24 Column 9, Line 40, change "situated so at automatically" to --situated so as to automatically--

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*